Nov. 6, 1962 H. L. C. WENK, JR 3,062,577
LOCKING SEAL
Filed Nov. 28, 1960

INVENTOR.
HENRY L.C. WENK, JR.
BY *(signature)*
ATTORNEY

United States Patent Office 3,062,577
Patented Nov. 6, 1962

3,062,577
LOCKING SEAL
Henry L. C. Wenk, Jr., Garden City, N.Y., assignor to American Casting and Manufacturing Corporation, Brooklyn, N.Y., a corporation of New York
Filed Nov. 28, 1960, Ser. No. 71,960
4 Claims. (Cl. 292—307)

This invention relates to seals and, more particularly, to a seal for controlling access to any desired object.

There are many situations requiring the use of a seal which functions somewhat like a hasp for holding or limiting movement between two relatively movable members, such as seals of the type used to hold a cover of an electric meter in a covering position over mechanical parts thereof. In an assembly such as these, it is often necessary to twist or otherwise manipulate the seal parts in order to attach it in place, thus requiring extensive manipulation and handling thereof. Accordingly, it is an object of the present invention to provide a seal which can be readily applied for such purposes, that is extremely simple in construction, economical to manufacture, and virtually foolproof in operation.

A further object of the present invention is to provide a seal in the form of a channel-shaped strip which can be readily bent into blocking position with relatively movable parts, but which seal will automatically fracture upon any attempt to unbend it, thus readily disclosing unauthorized access to the relatively movable parts.

Still an additional object of the present invention is to provide a frangible type seal which will readily detect unauthorized manipulation thereof by the condition of the parent material after installation thereof.

All of the foregoing and still further objects and advantages of this invention will become apparent from a study of the following specification, taken in connection with the accompanying drawing, wherein.

Figure 4:
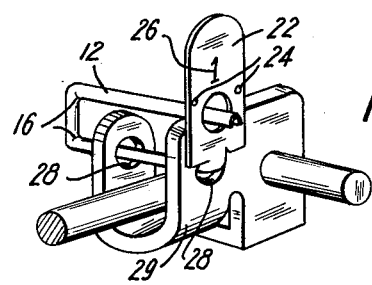
FIG. 4 is a view similar to FIGS. 2 and 3, illustrating a further step in the application procedure.
Figure 5:
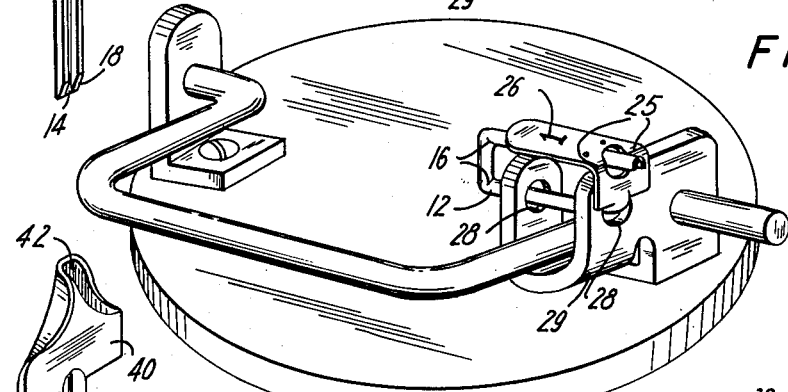
FIG. 5 is a view similar to FIGS. 2 and 4, illustrating the final sealed position of the apparatus.

Referring now more in detail to the drawing, and more particularly to FIGS. 1 to 5 thereof, a seal 10 made in accordance with one form of the present invention is shown to include an elongated strip of flexible material 12, of generally U-shaped channel cross-sectional configuration having a pair of sides and a connecting bight portion. The free edges of both sides of the elongated strip 12 are provided with a plurality of longitudinally spaced apart and outwardly opening V-shaped notches 16 which form miters about which the strip can be folded or bent into a circuitous member, such as shown in FIGS. 4 and 5. One end of the strip is provided with a beveled edge 18 for reception into a central aperture 20 in a tab 22 integrally formed at the opposite end of the strip during the final installation procedure.

The tab 22 is provided with indicia in the form of dimples or detents 24 which identify an inside surface of the tab 22, whereas the outside surface of the tab may be provided with any desired indicia 26 for identification purposes.

Figure 1:
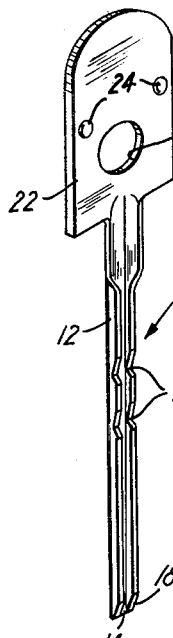
FIG. 1 is a perspective view of a seal made in accordance with one form of the present invention prior to actual use thereof.
Figure 2:
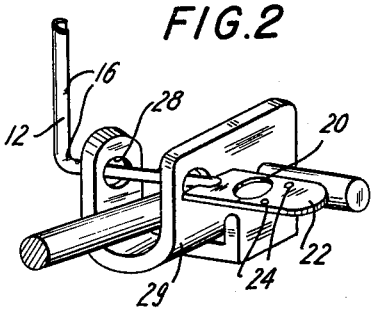
FIG. 2 is a perspective view illustrating the first step in applying the seal shown in FIG. 1 to a pair of relatively movable members.
Figure 3:
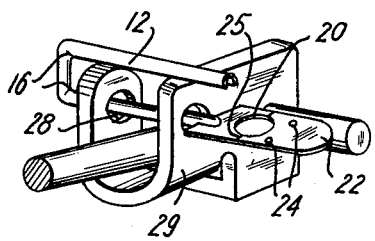
FIG. 3 is a view similar to FIG. 2, showing the next step in the application of the seal.

In actual use, the seal is applied in the manner illustrated in FIGS. 2 to 5 of the drawing, each of the miters 16 facilitating the bending of the seal into a secured position. Actually, the movement of the seal to the first position shown in FIG. 2 is sufficient to seal the relatively movable parts of the hasp 29, as once applied in this manner, the seal cannot be withdrawn in one direction because of the blocking action of the tab 22, and cannot be withdrawn in the opposite direction because of the abutment of the turned leg of the strip 12 with the object being controlled. However, by simply completing the application steps, the seal can be compactly and readily installed in the manner shown in FIG. 5, with the tab 22 finally folded about a transverse fold line 25 into the compact position illustrated.

The parent material of the strip and tab has very low ductility, such that it is adapted for one-time bending only, and any attempt to unbend the seal toward an open position will cause rupture of the strip along the fold lines, thus providing immediate detection of unauthorized access to the sealed parts.

The strip is provided in channel shape for added strength and through the notches provide the weakened areas to facilitate rupture, nevertheless when the seal strip is bent to securing position the walls of the notches contact to provide miters thus defining a relatively strong structure which can withstand considerable abuse so long as no attempt is made to unbend the bent portions of the seal.

Figure 6:
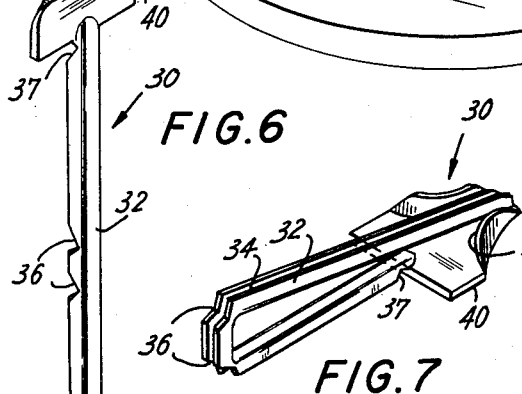
FIG. 6 is a view similar to FIG. 1, illustrating a slightly modified form of construction.
Figure 7:
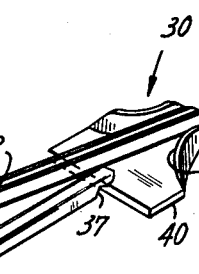
FIG. 7 is a perspective view of the seal shown in FIG. 6 in one type of applied arrangement.
Figure 8:
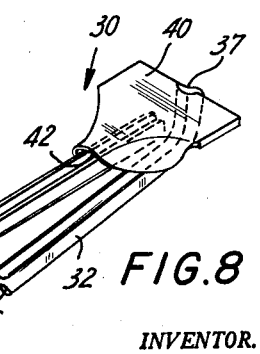
FIG. 8 is a bottom perspective view of the seal shown in FIG. 7.

With reference now to FIGS. 6 to 8 of the drawing, a slightly modified form of construction 30 is shown wherein the strip 32, of generally U-shaped channel cross-sectional configuration also has a pair of sides and connecting bight portion of the type hereinbefore described. In this embodiment, however, the strip 32 is provided with a plurality of longitudinally spaced apart sets of miter notches 36 intermediate the ends thereof, and an additional set of miter notches 37 adjacent to the tab 40 at one end thereof. The other end of the strip is also beveled at 38 in the manner hereinbefore described. This tab 40, however, instead of being apertured, is provided with upwardly formed edges that define a socket for at least partially receiving the opposite end 38 of the strip therewithin in the completely sealed position shown in FIGS. 7 and 8. This seal 30 may be readily folded in either direction, with the bight portion thereof outwardly disposed in the manner shown in FIGS. 1 to 5, or inwardly disposed in the manner shown in FIGS. 7 and 8. For use with larger members, however, the end 38 of the strip is simply folded down into the socket formed by the sides 42, as shown in FIG. 7. For use with smaller objects, the seal may be folded in the manner shown in FIG. 8, where the tab 40 is folded about the miter 37 into more compact and overlying sealed engagement with the end 38 of the strip.

While this invention has been described with particular reference to the construction shown in the drawing, it is to be understood that such is not to be construed as imparting limitations upon the invention, which is best defined by the claims appended hereto.

Having thus described my invention, what I claim as new and desire to secure by Letters Patent, is:

1. A seal comprising, in combination, an elongated strip, said strip being constructed of frangible material, said strip being of substantially U-shaped cross-sectional configuration having a pair of sides and a connecting bight portion, both of said sides defining a plurality of longitudinally spaced apart indents opening outwardly away from said bight portion to define weakened fold lines about which said strip is bendable, said fold lines of said strip being stressed beyond the elastic limit of the parent material during one-time bending thereof about an object to be controlled, whereby unbending of said strip about said respective fold line effects the fracture thereof, said fold lines extending transversely of said bight portion and said strip being bendable about said fold lines in selected directions transversely of said strip, said indents comprising V-shaped notches extending at least partly across the width of each said side toward said bight portion, said seal further comprising a tab integral with one end of said strip of larger dimensions than said strip for blocking longitudinal movement of said strip through a restricted opening, said tab defining a socket portion at least partly receiving the opposite end of said strip therewithin to prevent lateral movement of said opposite end and to define a circuitous strip around the object to be controlled.

2. A seal as set forth in claim 1, wherein said socket portion comprises an aperture in said tab slidably receiving said opposite end of said strip therethrough.

3. A seal as set forth in claim 1, wherein said socket portion comprises a channel defined by the oposite side edges of said tab for partly enveloping said opposite end of said strip.

4. A seal as set forth in claim 1, further comprising indicia carried by said tab identifying the opposite sides of said strip.

References Cited in the file of this patent
UNITED STATES PATENTS

| | | |
|---|---|---|
| 535,043 | Aldrich | Mar. 5, 1895 |
| 985,019 | Edgar | Feb. 21, 1911 |
| 1,146,754 | Evans | July 13, 1915 |
| 1,631,464 | Brooks | June 7, 1927 |
| 2,902,308 | Moberg | Sept. 1, 1959 |